(12) United States Patent
Baryudin

(10) Patent No.: US 9,176,896 B2
(45) Date of Patent: Nov. 3, 2015

(54) METHOD OF MANAGING ALIGNED AND UNALIGNED DATA BANDS IN A SELF ENCRYPTING SOLID STATE DRIVE

(71) Applicant: Seagate Technology LLC, Cupertino, CA (US)

(72) Inventor: Leonid Baryudin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 29 days.

(21) Appl. No.: 14/088,143

(22) Filed: Nov. 22, 2013

(65) Prior Publication Data

US 2015/0121088 A1    Apr. 30, 2015

Related U.S. Application Data

(60) Provisional application No. 61/897,366, filed on Oct. 30, 2013.

(51) Int. Cl.
*G06F 12/14* (2006.01)
*G06F 21/62* (2013.01)

(52) U.S. Cl.
CPC ........ *G06F 12/1408* (2013.01); *G06F 21/6218* (2013.01)

(58) Field of Classification Search
CPC G06F 21/1408; G06F 21/6218; G06F 21/602

USPC .......................................................... 713/193
See application file for complete search history.

(56) References Cited

U.S. PATENT DOCUMENTS

| | | |
|---|---|---|
| 8,856,553 B2 * | 10/2014 | Lyakhovitskiy et al. ...... 713/193 |
| 2005/0138285 A1 * | 6/2005 | Takaoka et al. ............... 711/114 |
| 2005/0144380 A1 * | 6/2005 | Suzuki et al. ................. 711/113 |
| 2010/0174922 A1 | 7/2010 | Johnson et al. ............... 713/193 |
| 2012/0144209 A1 | 6/2012 | Kahler et al. ................. 713/193 |
| 2012/0239943 A1 * | 9/2012 | Okamoto ....................... 713/193 |

* cited by examiner

*Primary Examiner* — Michael S McNally
(74) *Attorney, Agent, or Firm* — Christopher P. Maiorana, PC

(57) ABSTRACT

An apparatus includes a storage medium and a controller. The storage medium generally stores user data in logical pages. The controller may be configured to encrypt and decrypt user data during write and read operations, respectively. The user data is generally in a plurality of data bands. Each data band is encrypted and decrypted using a unique media encryption key. When a boundary between a pair of data bands is within a logical page, the controller may be configured to create two logical page instances, a first logical page instance storing data from a first data band of the pair of data bands and a second logical page instance storing data from a second data band of the pair of data bands. The first and second logical page instances are encrypted and decrypted using the unique media encryption key of the first and second data bands, respectively.

20 Claims, 5 Drawing Sheets

METHOD OF MANAGING ALIGNED AND UNALIGNED DATA BANDS IN A SELF ENCRYPTING SOLID STATE DRIVE

This application relates to U.S. Provisional Application No. 61/897,366, filed Oct. 30, 2013, which is hereby incorporated by reference in its entirety.

FIELD OF THE INVENTION

The invention relates to storage devices generally and, more particularly, to a method and/or apparatus to manage aligned and unaligned data bands in a self encrypting solid state drive.

BACKGROUND

Solid state drives/disks (SSDs) typically read/write a storage media using several kilobytes chunks (e.g., 4 KB or 8 KB), or logical pages (L-Pages), in order to optimize flash media access. The typical sector size associated with magnetic drives (i.e., 512 bytes) is too small. For Self Encrypting SSDs the L-Pages are encrypted as a whole using a single Media Encryption Key (MEK). The MEK is normally determined as a function of logical block address (LBA). An entire LBA space is subdivided into one or more LBA ranges (referred to as "data bands" or simply "bands"). A unique MEK is used for encrypting data in each data band. Since the data in each data band is encrypted with a unique MEK, having a data band boundary that is not aligned on an L-Page boundary will necessitate that parts of the single L-Page be encrypted with different MEKs, contrary to the generally accepted scheme where the entire L-Page is encrypted as a single unit.

It would be desirable to have a method and/or apparatus to manage aligned and unaligned data bands in a self encrypting solid state drive that overcomes the problem described above.

SUMMARY

The invention concerns an apparatus including a storage medium and a controller. The storage medium generally stores user data in logical pages. The controller may be configured to encrypt and decrypt user data during write and read operations, respectively. The user data is generally in a plurality of data bands. Each data band is encrypted and decrypted using a unique media encryption key. When a boundary between a pair of data bands is within a logical page, the controller may be configured to create two logical page instances, a first logical page instance storing data from a first data band of the pair of data bands and a second logical page instance storing data from a second data band of the pair of data bands. The first and second logical page instances are encrypted and decrypted using the unique media encryption keys of the first and second data bands, respectively.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a method and/or apparatus to manage aligned and unaligned data bands in self encrypting solid state drives/disks (SSDs) that may (i) allow data band boundaries having any logical block address (LBA) values while still accessing flash media on a logical page (L-Page) basis, (ii) maintain two instances of an L-Page divided by a data band boundary, (iii) save head sectors encrypted with a media encryption key (MEK) of a first data band in a first L-Page instance and tail sectors encrypted with a MEK of a second data band in a second L-Page instance, (iv) store a second copy (instance) of an L-Page divided by a data band boundary in LBAs above a user range, (v) store a second copy of an L-Page divided by a data band boundary in a root file area of a storage device, and/or (vi) be implemented as one or more integrated circuits.

Figure 1:
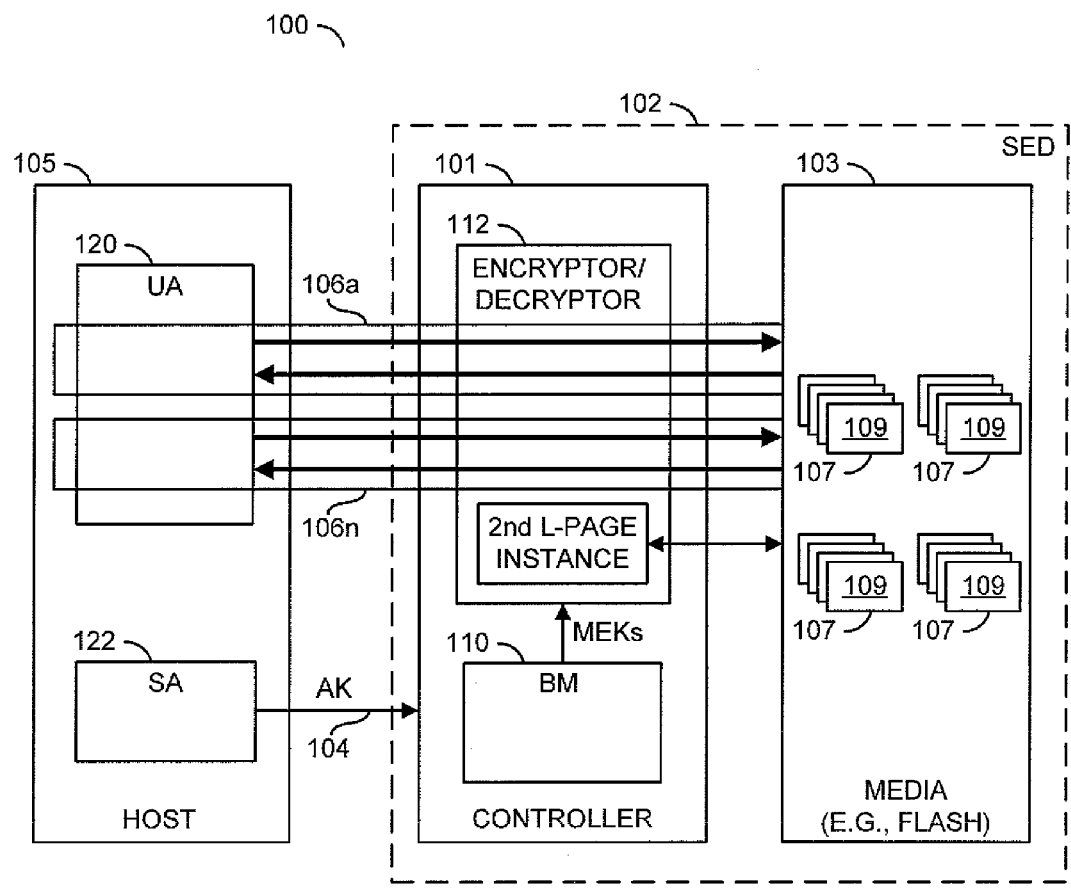
FIG. 1 is a diagram illustrating a system in accordance with an embodiment of the invention.

Referring to FIG. 1, a diagram of a system 100 is shown implementing a system in accordance with an embodiment of the invention. In various embodiments, the system 100 may be implemented as a self encrypting storage system. In some embodiments, the system 100 comprises a block 101, a block 103, and a block 105. The block 101 implements a storage controller in which a band management scheme in accordance with an embodiment of the invention is implemented. The block 103 implements a storage medium. In some embodiments, the block 103 comprises a non-volatile memory (NVM) media (e.g., FLASH memory, etc.). However, other types of media (e.g., volatile memory with or without battery support) may be implemented accordingly to meet the design criteria of a particular application. Although, with volatile memory, security (and data) would be lost upon power loss. The blocks 101 and 103 are operatively coupled to form a self-encrypting drive or disk (SED) 102. The block 105 comprises a host implementing an authentication key (AK) 104 and a plurality of data bands 106a-106n. The SED 102 and the host 105 are configured to be communicatively coupled to each other. The host 105 is configured to store data to and retrieve data from the SED 102 using the AK 104 and the data bands 106a-106n.

The controller 101 may be configured to control one or more individual memory channels. In some embodiments, the controller 101 may implement multiple memory channel controller instances to control a plurality of memory channels. The controller 101 has a media interface configured to couple the controller 101 to the storage media 103. In non-volatile memory (NVM) embodiments, the storage media 103 may comprises one or more non-volatile memory devices 107. The non-volatile memory devices 107 have, in some embodiments, one or more non-volatile memory targets (e.g., die, disk platter, etc.) 109. According to a type of a particular one of the non-volatile memory devices 107, a plurality of non-volatile memory targets 109 in the particular non-volatile memory device 107 are optionally and/or selectively accessible in parallel. The non-volatile memory devices 107 are generally representative of one type of storage device enabled to communicatively couple to the controller 101. However, in various embodiments, any type of storage device is usable, such as magnetic storage, optical storage, SLC (single level cell) NAND flash memory, MLC (multi-level cell) NAND flash memory, TLC (triple level cell) NAND flash memory, NOR flash memory, electrically programmable read-only memory (EPROM), static random access memory (SRAM), dynamic random access memory (DRAM), magneto-resistive random-access memory (MRAM), ferromagnetic memory (e.g., FeRAM, F-RAM, FRAM, etc.), phase-change memory (e.g., PRAM, PCRAM, etc.), racetrack memory (or domain-wall memory (DWM)), resistive random-access memory (RRAM or ReRAM), or any other type of memory device or storage medium.

In some embodiments, the controller 101 and the non-volatile memory media 103 are implemented on separate integrated circuits (or devices). When the controller 101 and the non-volatile memory media 103 are implemented as separate integrated circuits (or devices), the media interface of the controller 101 is generally enabled to manage a plurality of data input/output (I/O) pins and a plurality of control I/O pins. The data I/O pins and the control I/O pins may be configured to connect the device containing the controller 101 to the external devices forming the non-volatile memory media 103. In various embodiments, the controller 101 is implemented as an embedded controller. In various embodiments, the controller 101 and the NVM media 103 implement a solid state hybrid hard disk drive (SSHD), a hard disk drive (HDD), or a solid-state drive/disk (SSD).

The storage media 103 generally stores user data in logical pages (L-Pages). An L-Page is a group of logical block addresses (LBAs) corresponding to one or more logical sectors. An L-Page could be just 1 sector if 512 bytes would not be too inefficient a unit for solid state drive (SSD) access. In solid state drive embodiments, the smallest part of the physical media of the storage media 103 that can be read and ECC corrected is an e-page (or ECC page). The e-page comprises user data and ECC data. The ECC data is calculated over the whole e-page. An uncompressed L-Page (e.g., 4-8 KB) is normally bigger than an e-page (e.g., 0.5-2 KB). However, on the storage media 103 an L-Page to e-page ratio can vary (e.g., due to L-Page compression). Several L-Pages can be squeezed into a single e-page or a single L-Page can span multiple e-pages.

The controller 101 has a command interface configured to receive commands and send responses to the host 105. In embodiments implementing a plurality of non-volatile memory devices, the controller 101 includes at least one NVM control processor that manages the non-volatile memory devices via proprietary processes, and a host processor that manages the host interface according to other processes. The NVM control processor(s) and the host processor communicate via predefined interfaces. The host processor communicates host commands to the NVM control processor, which processes the commands according to predefined communication interfaces (or protocols).

In various embodiments, the controller 101 is configured to encrypt and decrypt user data during write and read operations, respectively. The user data is communicated in the plurality of data bands 106a-106n. Each of the data bands 106a-106n is encrypted and decrypted using a unique media encryption key (MEK) generated by the controller 101 based upon the AK 104 received from the host 105. In various embodiments, the controller 101 includes a band manager (BM) 110 and an encryption/decryption (E/D) block (or circuit) 112 configured to implement an aligned and unaligned (on L-page boundary) data band scheme in accordance with an embodiment of the invention. The band manager 110 stores key material (KM) used to generate the unique media encryption keys (MEKs) based upon the authentication key (AK) 104 received from the host 105.

When a boundary between a pair of data bands falls within an L-Page, the controller 101 creates two L-Page instances, a first L-Page instance storing data from a first data band of the pair of data bands and a second L-Page instance storing data from a second data band of the pair of data bands. The first and second L-Page instances are encrypted and decrypted using the unique media encryption keys of the first and second data bands, respectively.

In various embodiments, the host 105 includes a user application (UA) 120 and a security application (SA) 122. The UA 120 is configured to implement the plurality of data bands 106a-106n. The UA 120 transmits and receives data via the plurality of data bands 106a-106n. The security application 122 running on the host 105 authenticates the host 105 to the storage device 102 by providing the authentication key (AK) 104. The unique MEKs used by the ED 112 to encrypt and decrypt each of the data bands 106a-106n are generated by the band manager 110 based upon the authentication key (AK) 104.

Figure 2:
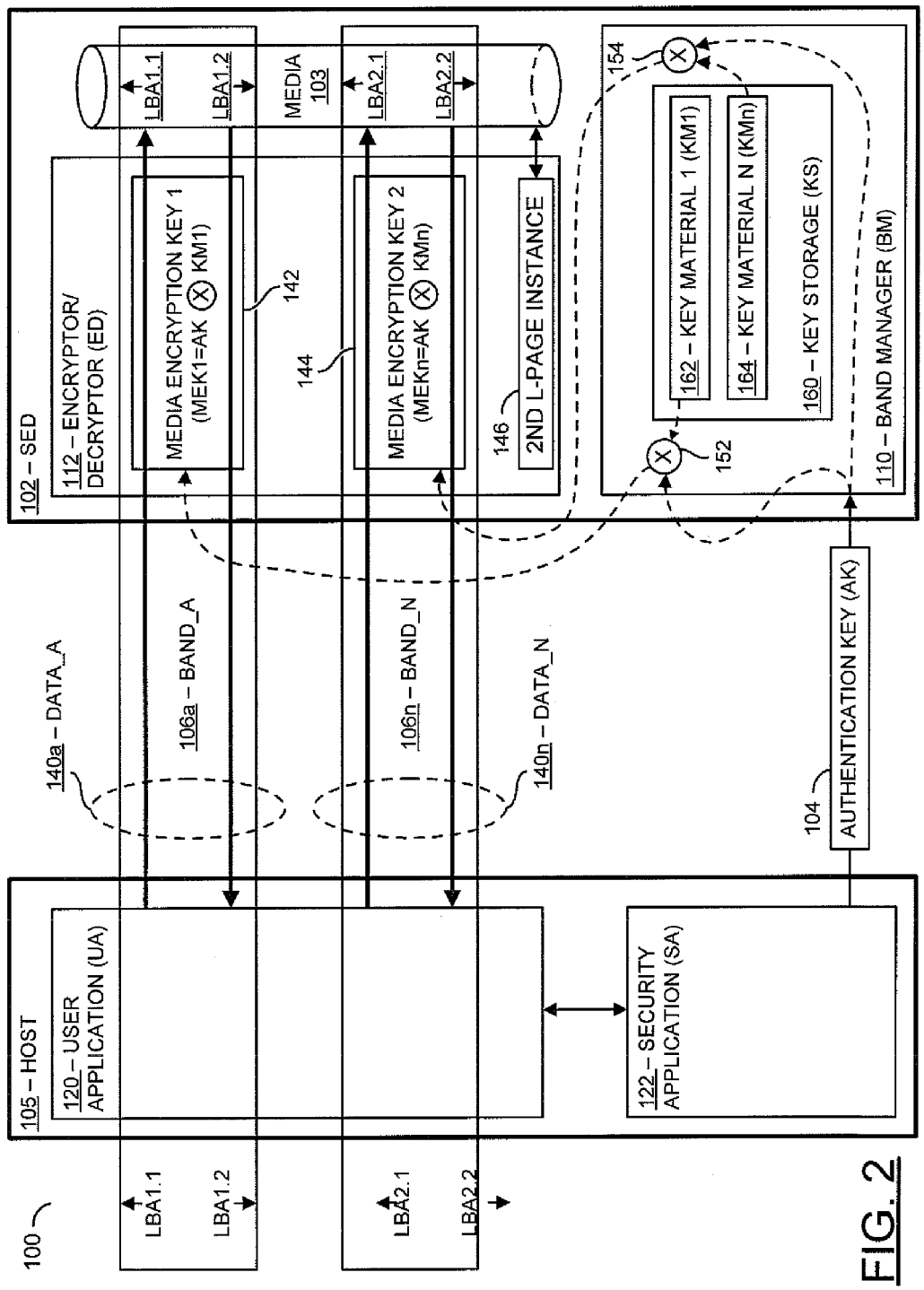
FIG. 2 is a diagram illustrating a scheme for managing aligned and unaligned data bands in accordance with an embodiment of the invention.

Referring to FIG. 2, a diagram is shown illustrating an example implementation of a data band scheme with multiple real bands in accordance with an embodiment of the invention using the system 100 of FIG. 1. In various embodiments, the encryption/decryption (E/D) block 112 is configured to handle the plurality of data bands 106a to 106n. For clarity of explanation only two data bands 106a and 106n are illustrated and discussed. However, other numbers of data bands may be implemented accordingly to meet the design criteria of a particular implementation. The band manager 110 includes a key storage (KS) 160 that stores key material (e.g., KM1 162 and KMn 164). The key material KM1 162 and KMn 164 is used by the SED 102 in connection with the encryption/decryption of the data bands 106a to 106n (e.g., using respective media encryption keys generated from the key material KM1 162 and KMn 164 by wrapping operations 152 and 154). Although the wrapping operations 152 and 154 are illustrated as multipliers, "wrapping" is used here in a very generic sense. In some embodiments, the key material KM1 162 and KMn 164 is simply the correspondent MEK, encrypted with the AK 104 (e.g., the AK 104 is used as a key encryption key (KEK), so the wrapping operations 152 and 154 are equivalent to an encryption operation). Encryption and decryption may include, but are not limited to, some version of AES or XTS. In some embodiments, wrapping may include, but is not limited to, performing an XOR between the AK 104 and the key material 162 and 164 (e.g., KM1 and KM2 in FIG. 2). However, any operation that does not reduce randomality of the key material 162 and 164 may be implemented accordingly to meet the design criteria of a particular application. In multi-band embodiments, respective MEKs (e.g., MEK1, MEK2, ..., MEKn) are generated for each of the n bands by wrapping the AK 104 with the respective key material 162, 164, ... (e.g., KM1, KM2, ..., KMn). The host 105 runs the user application (UA) 120, which is configured to manage the plurality of data bands 106a to 106n.

The operation of the system 100 is described below using a generic security paradigm which is found in several security protocols including but not limited to TCG Enterprise SSC, TCG Opal and/or ATA security. In various embodiments, self encrypting drives (SEDs) operate on LBA ranges (or data bands). In FIGS. 1 and 2, two bands 106a and 106n are shown for clarity. The host 105 normally runs some sort of security application (SA) 122 which authenticates the host with the SED 102 using the authentication key (AK) 104. In some embodiments, the encryptor/decryptor (ED) block 112 is implemented as a hardware (HW) module. The ED 112 maintains a table of the boundaries of each data band 106a and 106n (e.g., [LBA1.1-LBA1.2] for BAND_A and [LBA2.1-LBA2.2] for BAND_N). The table may be maintained as part of or separately from a flash translation layer (FTL) of the controller 101.

In these embodiments, when read/write data requests 140a and 140n arrive from the host 105, the ED 112 performs a lookup to classify the LBAs of the requests to one of data bands 106a-106n and to select the appropriate one of the MEKs 142 and 144. For read data requests, the read data is then decrypted with the selected MEK. For write data requests, the write data is encrypted with the selected MEK. When the boundary between the data bands 106a and 106n falls within an L-page, the ED 112 creates a second L-page instance 146 for the L-page containing the boundary to facilitate encrypting and decrypting data in the L-Page using the appropriate MEKs.

Figure 3:
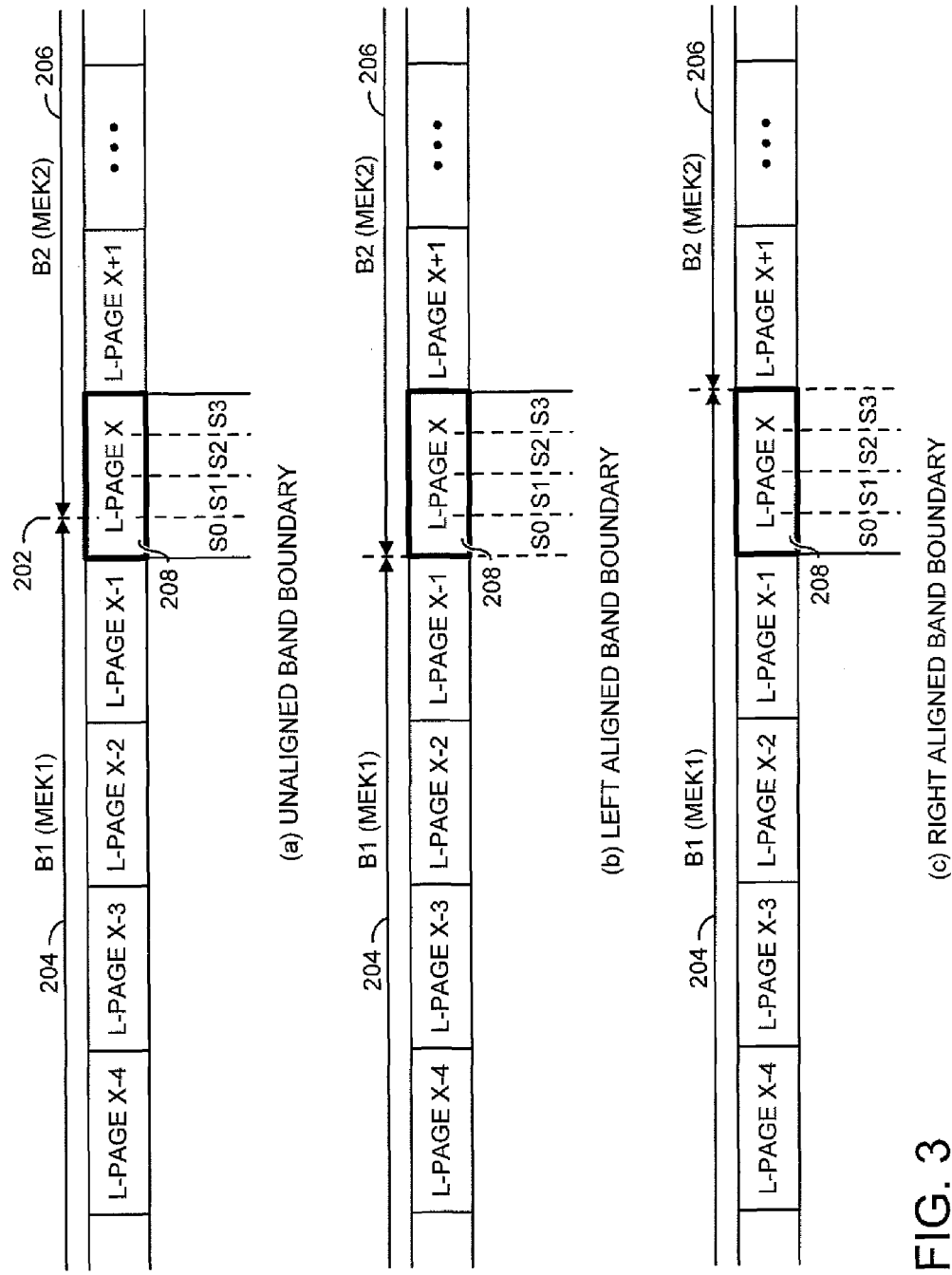
FIG. 3 is a diagram illustrating examples of aligned and unaligned data bands.

Referring to FIG. 3, diagrams are shown illustrating (a) an unaligned data band boundary, (b) a left aligned data band boundary, and (c) a right aligned data band boundary. A data band boundary 202 between a band 204 (e.g., band B1 using MEK1) and a band 206 (e.g., band B2 using MEK2) is illustrated. In diagram (a), the data band boundary 202 is shown falling within an L-Page 208 dividing the L-Page 206 between the two bands 204 and 206. A sector S0 (e.g., a "Head" sector) of the L-Page 206 needs to be encrypted with MEK1 while sectors S1 to S3 (e.g., "Tail" sectors) of the L-Page 206 need to be encrypted with MEK2. Because the L-Pages are written (and encrypted) as a whole, the encryption of the L-Page 206 with two different MEKs is not possible if the L-Page X is stored as any other L-Page, where only one instance of the L-Page 206 exists. In such a situation, the bands B1 and B2 would be forced to have a boundary aligned on the beginning of the L-Page 206 (e.g., left aligned as in diagram b) or on the end of the L-Page 206 (e.g., right aligned as in diagram c).

Figure 4:
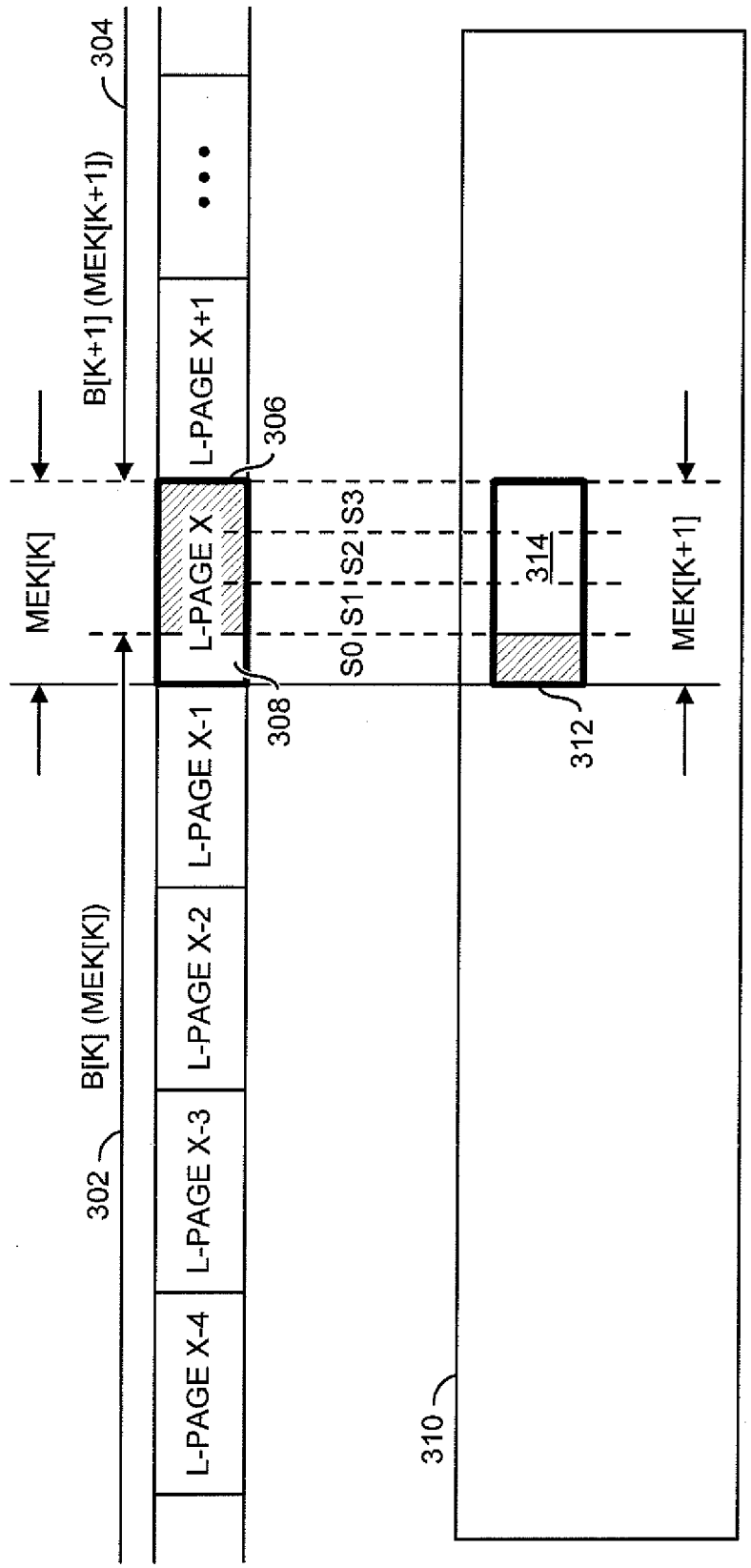
FIG. 4 is a diagram illustrating an example implementation of head and tail instances of a logical page (L-Page) in accordance with an embodiment of the invention.

Referring to FIG. 4, a diagram is shown illustrating an example implementation of L-Page head and tail instances in accordance with an embodiment of the invention. In order to use with different media encryption keys (MEKs) to encrypt and decrypt head and tail sectors of a single L-Page in which a boundary between a data band 302 and a data band 304 falls, two instances (e.g., a head instance and a tail instance) of the L-Page need to be stored. A head instance 306 and a tail instance 312 of an L-Page X are shown. The head instance 306 of the L-Page X contains data of the head sector or sectors 308 of the L-Page X, while an area corresponding to the tail sector or sectors 314 is filled by zeroes (or any other predefined pattern). The tail instance 312 of the L-Page X contains data of the tail sector or sectors 324 of the L-Page X, while an area corresponding to the head sector or sectors 308 is filled by zeroes (or any other predefined pattern).

In some embodiments, the head instance 306 is stored where the original L-Page X would be stored, while the tail instance 312 is stored in a separate "out of band" storage area 310. In further embodiments, the out of band storage area 310 can be a portion of the LBA area located above an area visible to the host 105 (e.g., defined by a value MAX_LBA). In other embodiments, the out of band storage area 310 can be located in a non-user area (e.g., a so-called Root file area) of the storage media 103 where other system data is located.

When any of head sectors are being read, the head instance 306 is used, otherwise the tail instance 312 is used. During write operations to any of the head sectors 308, the head instance 306 is read, the head sector(s) overwritten, and the entire head instance of the L-Page written back. Similarly during write operations to any of the tail sectors, the tail instance 312 is read, the tail sector(s) overwritten, and the entire tail instance of the L-Page written back. Write operations involving both head and tail sectors (including entire L-Page writing) will result in reading and writing back both head and tail instances of the L-Page through which the boundary of the data bands runs. Therefore, writing into the L-Page containing the boundary between the two unaligned bands involves a Read-Modify-Write operation. Although such an operation is not very economical, such operations happen only for L-Pages which are crossed by band boundaries, which is a very rare occurrence.

Figure 5:
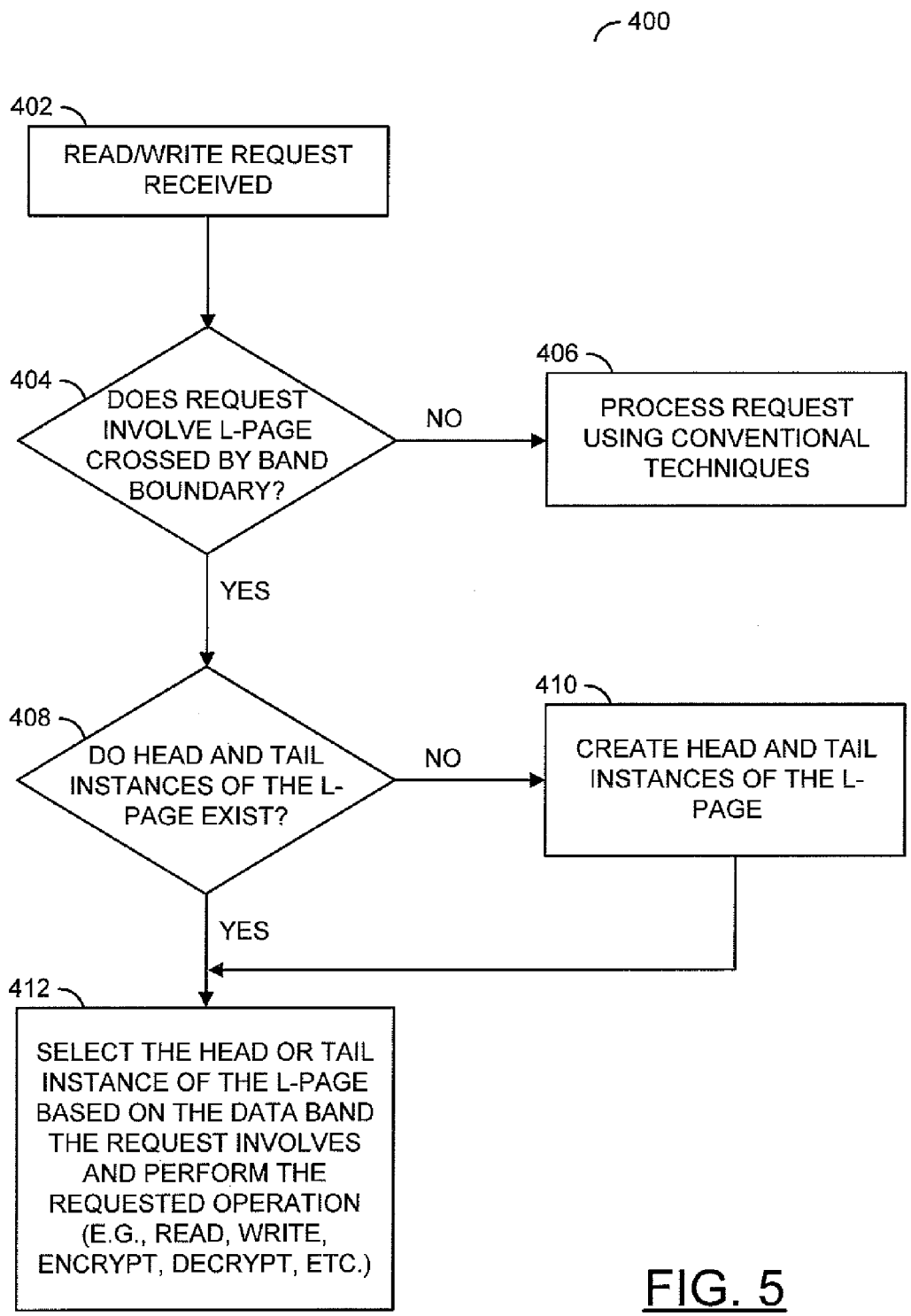
FIG. 5 is a flow diagram illustrating a process for managing aligned and unaligned data bands in accordance with an embodiment of the invention.

Referring to FIG. 5, a flow diagram is shown illustrating a process 400 in accordance with an embodiment of the invention. In various embodiments, the process (or method) 400 comprises a number of steps (or states) 402-412. In the step 402, the process 400 receives a read/write request (e.g., from the host 105). In a step 404, the process 400 determines whether the request involves a logical page crossed by a boundary between two data bands. If the request does not involve a logical page crossed by a boundary between two data bands, the process 400 moves to a step 406 where the request is handled using conventional techniques. If the request does involve a logical page crossed by a boundary between two data bands, the process 400 moves to a step 408.

In the step 408, the process 400 determines whether head and tail instances of the logical page crossed by the band boundary exist. If head and tail instances do not exist, the process 400 moves to a step 410 where head and tail instances are created. When the head and tail instances have been created or if the step 408 determines that head and tail instances already exist, the process 400 moves to the step 412. In the step 412, the process 400 selects either the head or tail instance depending upon which data band the request involves and performs the operation (e.g., read, write, encrypt, decrypt, etc.) associated with the request.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
a storage medium configured to store data in logical pages; and
a controller communicatively coupled to the storage medium, the controller configured to encrypt and decrypt user data during write and read operations, respectively, wherein
(i) the user data is in a plurality of data bands and each data band is encrypted and decrypted using a unique media encryption key,
(ii) the write and read operations are performed using units of logical pages, and
(iii) when a boundary between a first data band and a second data band is within a single logical page, the controller is configured to create two page instances corresponding to the single logical page containing the boundary of the data bands, a first page instance storing data from the first data band and a second page instance storing data from the second data band, wherein the first page instance is encrypted and decrypted using the unique media encryption key of the first data band and the second page instance is encrypted and decrypted using the unique media encryption key of the second data band.

2. The apparatus according to claim 1, wherein the controller comprises:
an encryption and decryption circuit configured to encrypt and decrypt the user data in each of the plurality of data bands using the unique media encryption key; and
a band manager circuit configured to generate the unique media encryption keys for the plurality of data bands.

3. The apparatus according to claim 1, wherein the second page instance is stored outside a logical block address space of the plurality of data bands.

4. The apparatus according to claim 1, wherein the second page instance is stored in a non-user area of the storage medium.

5. The apparatus according to claim 1, wherein the second page instance is stored in a root file system of the storage medium.

6. The apparatus according to claim 1, wherein the unique media encryption keys are generated by the controller based upon an authentication key and logical block address range of each of the read and write operations.

7. The apparatus according to claim 1, wherein the controller is implemented as one or more integrated circuits.

8. The apparatus according to claim 1, wherein the storage medium is part of a solid state drive or disk.

9. A system comprising:
a storage device configured to encrypt and decrypt user data during write and read operations, respectively; and
a host device configured to communicatively couple to the storage device, the host device configured to execute the write and read operations using a plurality of data bands, wherein
(i) the storage device is configured to encrypt and decrypt the user data in the plurality of data bands using a unique media encryption key for each data band,
(ii) the write and read operations are performed using units of logical pages, and
(iii) when a boundary between a first data band and a second data band is within a single logical page, the storage device is configured to create two page instances corresponding to the single logical page containing the boundary of the two data bands, a first page instance storing data from the first data band and a second page instance storing data from the second data band, wherein the first page instance is encrypted and decrypted using the unique media encryption key of the first data band and the second page instance is encrypted and decrypted using the unique media encryption key of the second data band.

10. The system according to claim 9, wherein the storage device comprises a self-encrypting solid state drive or disk.

11. The system according to claim 9, wherein the second page instance is stored outside a logical block address space of the plurality of data bands.

12. The system according to claim 9, wherein the second page instance is stored in a non-user area of the storage device.

13. The system according to claim 9, wherein the second page instance is stored in a root file system of the storage device.

14. The system according to claim 9, wherein the unique media encryption keys are generated by the storage device based upon an authentication key and logical block address range of each of the read and write operations.

15. The system according to claim 9, wherein the storage device comprises:
an encryption and decryption circuit configured to encrypt and decrypt the user data in each of the plurality of data bands using the unique media encryption key; and
a band manager circuit configured to generate the unique media encryption keys for the plurality of data bands in response to an authentication key received from the host device.

16. A method comprising:
receiving user data in a plurality of data bands;
storing the user data in a storage medium using logical pages; and
encrypting and decrypting the user data during write and read operations, respectively, wherein
(i) the user data in each data band of the plurality of data bands is encrypted with a unique media encryption key,
(ii) the write and read operations are performed in units of the logical pages, and
(iii) when a boundary between first of data band and a second data band is within a single logical page, creating two page instances corresponding to the logical page containing the boundary between the two data bands, a first page instance storing data from the first data band and a second page instance storing data from the second data band, wherein the first page instance is encrypted and decrypted using the unique media encryption key of the first data band and the second page instance is encrypted and decrypted using the unique media encryption key of the second data band.

17. The method according to claim 16, further comprising storing the second page instance outside a logical block address space of the plurality of data bands.

18. The method according to claim 16, further comprising storing the second page instance in a non-user area of the storage medium.

19. The method according to claim 16, further comprising storing the second page instance in a root file system of the storage medium.

20. The method according to claim 16, further comprising generating the unique media encryption keys based upon an authentication key and logical block address range of each of the read and write operations.

* * * * *